United States Patent
Breitenbach et al.

(10) Patent No.: US 12,287,700 B2
(45) Date of Patent: Apr. 29, 2025

(54) SYSTEMS AND METHODS FOR PREDICTIVE MEMORY MAINTENANCE VISUALIZATION

(71) Applicant: SAP SE, Walldorf (DE)

(72) Inventors: Tim Breitenbach, Mitgenfeld (DE); Lauritz Rasbach, Obertshausen (DE); Patrick Jahnke, Leimen (DE)

(73) Assignee: SAP SE, Walldorf (DE)

( * ) Notice: Subject to any disclaimer, the term of this patent is extended or adjusted under 35 U.S.C. 154(b) by 83 days.

(21) Appl. No.: 18/296,593

(22) Filed: Apr. 6, 2023

(65) Prior Publication Data
US 2024/0338271 A1  Oct. 10, 2024

(51) Int. Cl.
*G06F 11/00*  (2006.01)
*G06F 11/07*  (2006.01)

(52) U.S. Cl.
CPC ........ *G06F 11/0769* (2013.01); *G06F 11/073* (2013.01); *G06F 11/0775* (2013.01)

(58) Field of Classification Search
CPC . G06F 11/073; G06F 11/0769; G06F 11/0775
See application file for complete search history.

(56) References Cited

U.S. PATENT DOCUMENTS

| | | | | |
|---|---|---|---|---|
| 6,009,545 A * | 12/1999 | Tsutsui | | H01L 22/20 714/799 |
| 6,067,259 A * | 5/2000 | Handa | | G11C 29/808 365/230.03 |
| 6,108,253 A * | 8/2000 | Ohta | | G06F 11/2257 365/201 |
| 10,599,504 B1 | 3/2020 | Beserra | | |
| 10,887,331 B2 * | 1/2021 | Nomura | | H04L 41/0677 |
| 11,537,468 B1 * | 12/2022 | Ghosh | | G06F 11/1068 |
| 2002/0099996 A1 * | 7/2002 | Demura | | G11B 20/10 |
| 2004/0083410 A1 * | 4/2004 | Cutter | | G06F 11/263 714/57 |
| 2004/0098644 A1 * | 5/2004 | Wuu | | G11C 29/56 714/723 |
| 2004/0243891 A1 * | 12/2004 | Ohta | | G01R 31/31718 714/721 |
| 2005/0160311 A1 | 7/2005 | Hartwell et al. | | |

(Continued)

OTHER PUBLICATIONS

Du, Xiaoming et al., "Predicting Uncorrectable Memory Errors from the Correctable Error History: No Free Predictors in the Field", The International Symposium on Memory Systems, 2021, 8 pages.

(Continued)

*Primary Examiner* — Joshua P Lottich
(74) *Attorney, Agent, or Firm* — Fountainhead Law Group, PC

(57) ABSTRACT

Embodiments of the present disclosure include techniques for predictive memory maintenance. In one embodiment, error locations in a RAM are specified by columns and rows. Error locations are detected and stored in a storage system. One or more plots of the error locations may be presented to a user. In some embodiments, the error locations are time stamped. Rules may be defined to automatically detect patterns of error locations statically or over time. Alerts may be generated automatically to perform maintenance of a computer system with failing memory.

17 Claims, 5 Drawing Sheets

(56) References Cited

U.S. PATENT DOCUMENTS

| | | | |
|---|---|---|---|
| 2007/0247937 A1* | 10/2007 | Moriyama | G11C 29/56008 365/200 |
| 2009/0006886 A1 | 1/2009 | O'Connor et al. | |
| 2009/0052330 A1 | 2/2009 | Matsunaga et al. | |
| 2009/0144579 A1 | 6/2009 | Swanson | |
| 2009/0319822 A1 | 12/2009 | Coronado et al. | |
| 2011/0320864 A1 | 12/2011 | Gower et al. | |
| 2013/0036325 A1 | 2/2013 | Matsui et al. | |
| 2014/0359367 A1 | 12/2014 | Friman et al. | |
| 2018/0046541 A1 | 2/2018 | Niu et al. | |
| 2019/0004896 A1 | 1/2019 | Tokoyoda | |
| 2020/0066353 A1* | 2/2020 | Pletka | G06F 3/0604 |
| 2020/0135293 A1 | 4/2020 | Raychaudhuri et al. | |
| 2020/0183616 A1* | 6/2020 | Liikanen | G06F 3/0659 |
| 2020/0273499 A1* | 8/2020 | Jaenisch | G06F 9/3004 |
| 2021/0133022 A1 | 5/2021 | Chao | |
| 2021/0318922 A1* | 10/2021 | Roberts | G06F 11/0793 |
| 2021/0357287 A1 | 11/2021 | Kim | |
| 2022/0050603 A1 | 2/2022 | Zhou et al. | |
| 2022/0156160 A1 | 5/2022 | Wang | |
| 2022/0284980 A1* | 9/2022 | Chiang | G11C 29/44 |
| 2023/0098902 A1 | 3/2023 | Desai et al. | |
| 2023/0207045 A1 | 6/2023 | Harry-Hak-Lay et al. | |
| 2023/0342245 A1* | 10/2023 | Zhang | G06F 11/076 |
| 2024/0012726 A1* | 1/2024 | Thacker | G06N 3/047 |

OTHER PUBLICATIONS

Du, Xiaoming et al., "Fault-Aware Prediction-Guided Page Offlining for Uncorrectable Memory Error Prevention", 2021 IEEE 39th International Conference on Computer Design (ICCD), 2021, 8 pages.

Du, Xiaoming et al., "Predicting Uncorrectable Memory Errors for Proactive Replacement: An Empirical Study on Large-Scale Field Data", 2020 16th European Dependable Computing Conference (EDCC). 2020, 6 pages.

Du, Yuyang et al., "A Rising Tide Lifts All Boats: How Memory Error Prediction and Prevention Can Help with Virtualized System Longevity", Sixth Workshop on Hot Topics in System Dependability (HotDep 10), 2010, 6 pages.

Giurgiu, Iloana et al., "Predicting DRAM Reliability in the Field with Machine Learning", Proceedings of the 18th ACM/IFIP/USENIX Middleware Conference: Industrial Track, 2017, 7 pages.

Meza, Justin et al., "Revisiting Memory Errors in Large-Scale Production Data Centers: Analysis and Modeling of New Trends from the Field", 2015 45th Annual IEEE/IFIP International Conference on Dependable Systems and Networks, 2015, 12 pages.

Schroeder, Bianca et al., "DRAM Errors in the Wild: A Large-Scale Field Study", ACM Sigmetrics Performance Evaluation Review, 2009, 12 pages.

Second Generation Intel Xeon Scalable Processors Datasheet, vol. Two: Registers, Section 3.4, pp. 41-48, Apr. 2019, 60 pages.

Intel 64 and IA-32 Architectures Software Developer's Manual, vol. 3B: System Programming Guide, Part 2, Intel Machine Check architecture described in Chapters 15-16, pp. 43-112, Sep. 2016, 582 pages.

Intel Xeon Processor E7 Family: Reliability, Availability, and Serviceability, Advanced data integrity and resiliency support for mission-critical deployments, 2011, 16 pages.

* cited by examiner

SYSTEMS AND METHODS FOR PREDICTIVE MEMORY MAINTENANCE VISUALIZATION

BACKGROUND

The present disclosure relates generally to memory systems, and in particular, to systems and methods for predictive memory maintenance visualization.

Computer memories store information used by computer systems, such as computer servers, to perform tasks. Information may be data and instructions that are retrieved and used by one or more processors of the computer system to execute programs, for example. Data is stored as zeros (0) and ones (1), which are referred to as bits. One common form of memory is the random access memory (RAM). RAM modules are devices that consist of subunits which store bits. When bit errors occur, information of particular bits is lost. A single bit error can be corrected by an error correction code (ECC). However, in some cases, when two bits are corrupted, the information of the corrupted bits cannot be restored. In such an uncorrectable case, the corresponding computer program or task may fail.

The number of uncorrectable bit errors is likely to scale with the amount of physically damaged subunits within a RAM module. Consequently, to prevent server computers from severe issues, a reasonable predictive maintenance strategy is needed to focus on replacing RAM modules with the highest amount of damage first.

The present disclose is directed to techniques for predictive maintenance, including visualization techniques, for example.

DETAILED DESCRIPTION

Described herein are techniques for predictive memory maintenance visualization. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Features and advantages of the present disclosure may help distinguish single bit errors that may be coincidental (e.g., variations in voltage, cosmic rays, . . . ) from single bit errors that are associated with a broken subunit or with a subunit where a transient from normal working to broken is taking place (e.g., wear out/aging over a period of time). The single bit errors may be identified when information is read from the RAM module. Since the number of errors of a subunit scales with number of accesses to it, a number of errors per read bit may be used as a metric. For this purpose, the date, the address and optionally the wrong value of the single bit error may be stored in a data store as well the read bits between two errors. From this data, subunits with a statistically significant (e.g., according to a mathematical framework such as a Binomial distribution) high error rate compared to an average rate may be marked as suspicious. The present disclosure includes a visualization technique to identify patterns of errors in a RAM. Some embodiments include rules, formulated based on the patterns, that predict failures and generate alerts so maintenance can be performed before the RAM errors cause larger system failures, for example.

Figure 1:
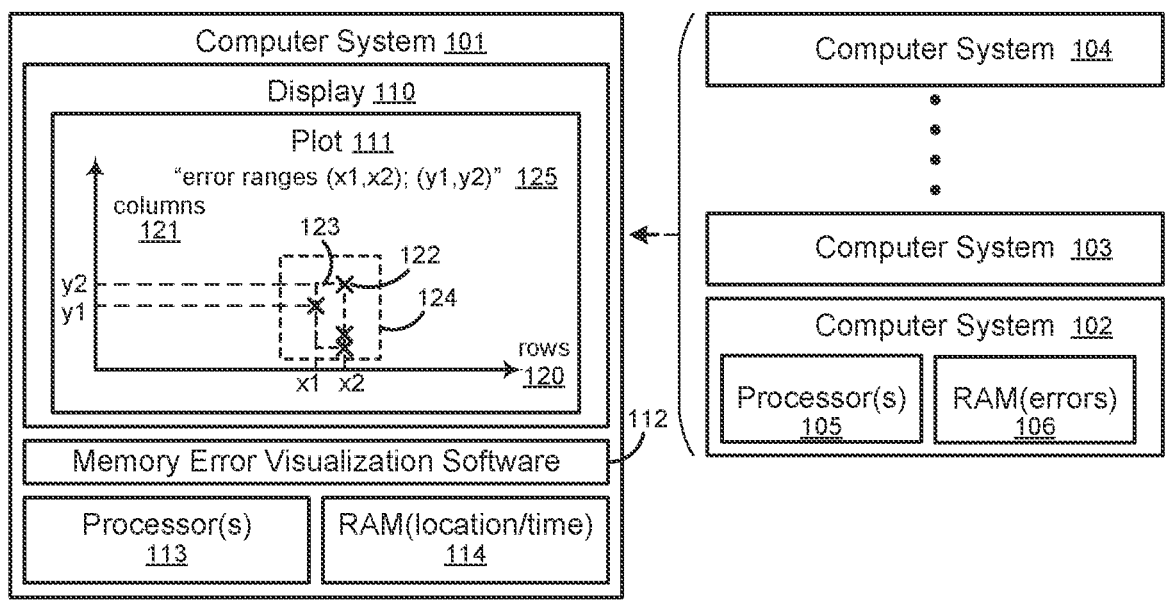
FIG. 1 illustrates a system for managing memory errors according to an embodiment.

FIG. 1 illustrates a computer system for managing memory errors according to an embodiment. Computer system 101 may be configured with memory error visualization software 112 to monitor, visualize, and/or implement predictive maintenance on one or more computer systems 102-104. Computer systems 102-104 may be server computers in a data processing center, server array, or cloud computer system, for example. Computer systems 102-104 may include one or more processors 105 and RAM 106. Computer system 101 may monitor errors in RAM 106 of computer systems 102-104 either by a direct connection to each particular computer or over a local or remote network, for example.

Computer system 101 may comprise RAM 114 and one or more processors 113 for executing memory error visualization software 112. Computer system 101 may comprise a display 110 to display information to a user. Advantageously, bit errors in RAM 106 may be detected. For each bit error, a row and a column in RAM 106 where each bit error occurred may be determined. Accordingly, the row and column specify error locations for each detected bit error. The rows and columns may be retrieved and stored in computer system 101 (e.g., in RAM 114 or a data store on a storage drive (not shown). Additionally, in some embodiments, the errors, rows, and columns may be associated with a time (e.g., a time stamp, including an actual time or a date, for example).

Features and advantages of the present disclosure include generating a plot 111 in display 110 of the bit errors. Plot 111 displays indications 122 of the error locations in RAM 106. The indications of the error locations are displayed based axes corresponding to the rows or columns. Here, the x-axis corresponds to rows 120 of RAM 106 and the y-axis corresponds to columns 121 of RAM 106. Plot 111 illustrates a cluster of four (4) indicators ("x") of bit errors at locations in RAM 106 having coordinates specified by the x,y-coordinates of each indicator in the plot. It can be seen from FIG. 1 that a cluster of indications of the error locations may define a range 123 (e.g., between x1,x2 and y1,y2). The ranges 123 specifying a corresponding cluster of the error locations may be displayed at 125 (e.g., "error ranges: (x1,x2); (y1,y2)") in plot 111. In some cases, error locations in large RAMs may not be visible without zooming in on the errors. When the display is showing the whole range of rows and columns, errors may be entirely invisible to the eye.

Accordingly, displaying ranges in the plot 111 allows users to select portions of the plot to zoom in on. Accordingly, in some embodiments, the computer system 101 may receive a graphical selection of the plot 111 including a range 124. Range 124 may be greater than range 123 of column and row values by an offset to encompass the cluster of error locations, for example. After the selection, plot 111 may be regenerated. The regenerated plot (described further below) displays a subset of the first axis and a subset of the second axis based on the graphical selection to zoom in on said at least one of the ranges. As described in more detail below, allowing users to visually analyze patterns in bit errors allows for definition of rules that may be used to automatically detect failing RAMs and, in some cases, generate alerts.

Figure 2:
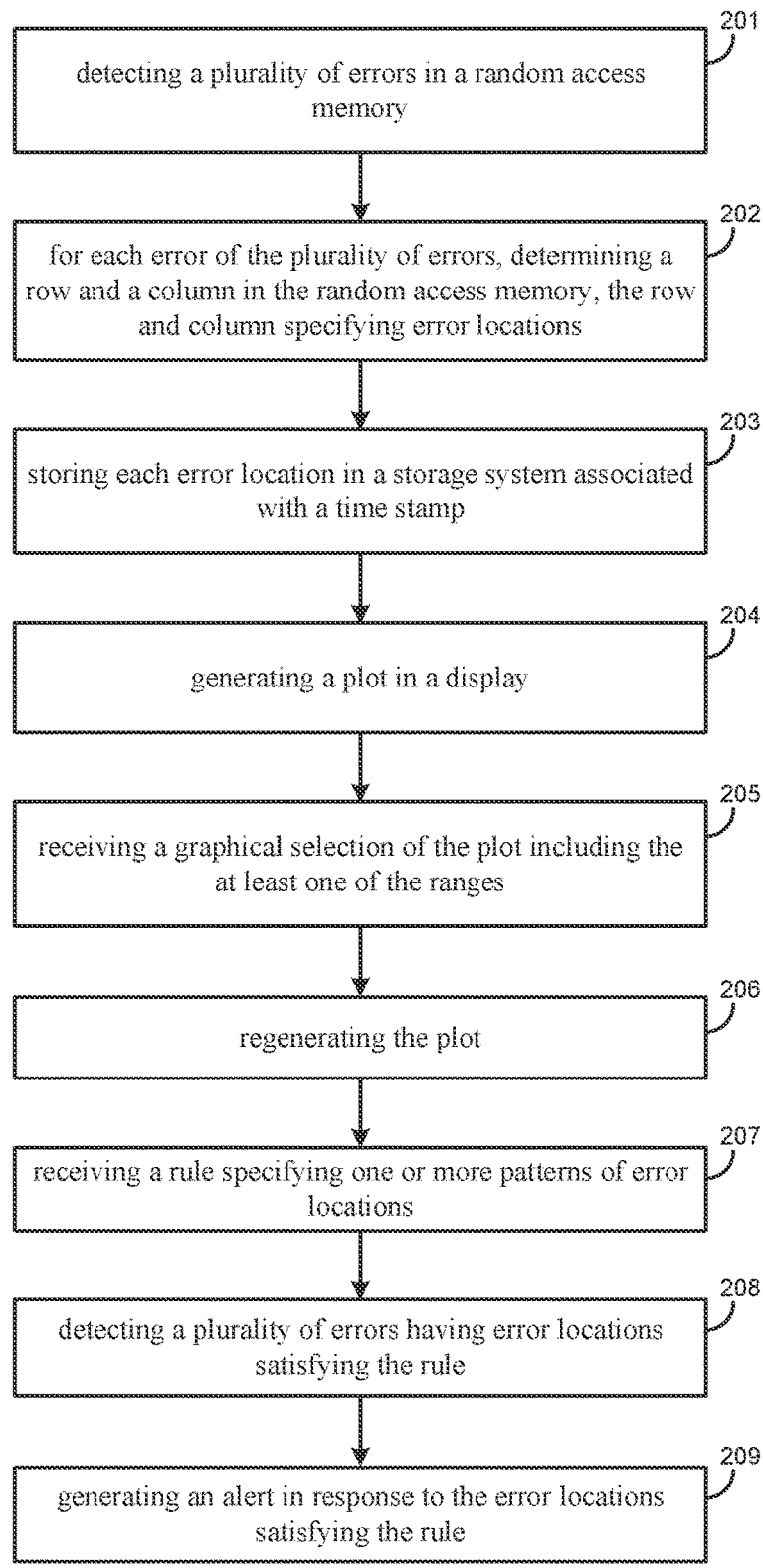
FIG. 2 illustrates a method of managing memory errors according to an embodiment.

FIG. 2 illustrates a method of managing memory errors according to an embodiment. At 201, a plurality of bit errors are detected in a RAM. At 202, for each error of the plurality of errors, a row and a column in the RAM is determined, where the row and column specifying error locations. At 203, each error location is stored in a storage system, and may further be associated with a time stamp, for example. At 204, a plot is generated in a display. The plot may display indications of the error locations, where the indications of the error locations are displayed based a first axis corresponding to one of the rows or columns and a second axis corresponding to the other one of the rows or columns. At 205, a graphical selection of the plot is received. The graphical selection may include at least one of the ranges. As mentioned above, the graphical selection may form a second range greater than the first range by an offset so that clusters of errors in the first range are within the second range. At 206, the plot is regenerated to zoom in the on second range (e.g., the axes may be reset to the second range). A user may, thus, zoom into particular clusters of errors and evaluate the errors. At 207, a rule may be received specifying one or more patterns of error locations, for example. The rule may define relationships between error locations (e.g., statically or over time). Time stamping the error locations may allow trends in failures to be captured by rules, for example. The rule may be generated based on visual inspection and analysis of the error locations over time, for example. At 208, a plurality of errors having error locations satisfying the rule are detected. At 209, alerts are generated in response to the error locations satisfying a rule.

Figure 3:
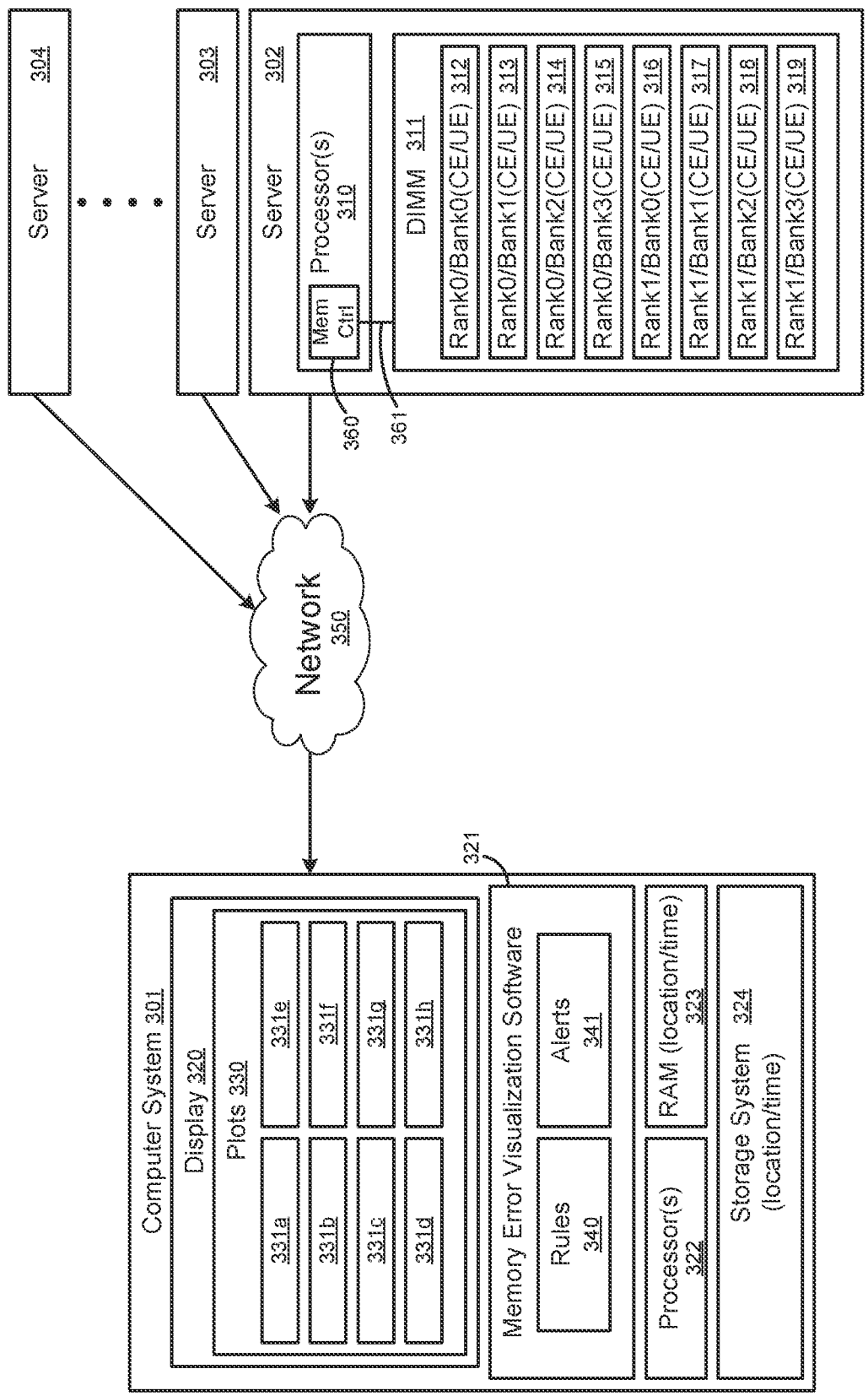
FIG. 3 illustrates a system for managing memory errors in a plurality of servers according to an embodiment.

FIG. 3 illustrates an example system for managing memory errors in a plurality of servers according to an embodiment. In this example, a computer system 301 comprising processor(s) 322 and RAM 323 executes memory error visualization software 321 to monitor bit errors in memory systems across multiple servers 302-304, which may be one or more data centers. Server 302 includes one or more processors 310 coupled to one or more dual in-line memory modules ("DIMMs"), such as DIMM 311, for example. DIMMs may comprise a plurality of dynamic random-access memory (DRAM) integrated circuits (ICs). In this example, DIMM 311 comprises eight (8) DRAM ICs 312-319. DRAMs 312-319 on DIMM 311 may be organized as two (2) ranks (Rank0 and Rank1) each having four (4) banks (Bank0-3). Processor(s) 310 may communicate data to and from DIMM 311 over one or more channels 316 between DIMM 311 and memory controller(s) ("Mem Ctrl") 360 on processor(s) 310. Memory reads to the DRAMs 312-319 may be processed by an error correction code (ECC) circuit (not shown). Errors in DRAMs memory cells may be either correctable errors (CE) or uncorrectable errors (UE). In some embodiments, a plurality of bits may be stored together (e.g., as an 8-bit byte), and read out of a memory together. If a single bit has an error, the ECC can correct the error. Such an error is tagged as a CE. However, if there are two (2) bit errors, an ECC may not be able to correct the error. Such an error is tagged as a UE. Memory controller(s) 360 may store data for each read specifying whether or not the read for each group of bits was successful, a CE, or a UE for particular memory addresses. Features and advantages of the present disclosure include retrieving the data for the CE and UE events over time and storing the data in a data storage system 324 and/or RAM 323 accessible by computer system 301. The addresses of the CEs and UEs (error data) may be converted to physical locations (e.g., particular columns and rows of each DRAM IC), time stamped (e.g., date and time the CE or UE occurred), and stored in storage system 324 with an indicator of one or more of the DIMM, rank, or bank the error came from, for example, for presentation and further analysis.

In one embodiment, memory error and visualization software 321 further associates error date from particular memory locations (e.g., particular DRAMs 312-319) with particular plots 331*a-h* of plots 330. For example, plot 331*a* may display error data associated with DRAM 312 (rank0/bank0), plot 331*b* may display error data associated with DRAM 313 (rank0/bank1), and so on up to plot 331*h* displaying error data associated with DRAM 319 (rank1/bank3). Accordingly, a plurality of plots 331*a-h* may be generated for the plurality of banks across the plurality of ranks. Each plot 331*a-h* displays one or more indications of the error locations (e.g., clusters) in corresponding DRAM 312-319. Accordingly, particular portions of a DIMM (e.g., individual banks) may be mapped to particular plots 331*a-h* (e.g., by associated CE and UE data with such portions in storage 324). Separate queries may be generated for error locations for each of the plurality of banks from storage system 324. Finally, software 321 may plot error locations for each of the plurality of banks in separate plots in the display. In some embodiments, software 321 may include rules 340. Rules 340 may define patterns of CE errors that may cause UEs. Other rules may define sizes of frames around predefined CE patterns (e.g., ranges to zoom in around the patterns) to allow the patterns to be recognized automatically, for example. In some embodiments, CE patterns satisfying rules 340 may trigger alerts 341, which may indicate that maintenance is required on a particular DIMM for a particular server, for example.

Figure 4A:
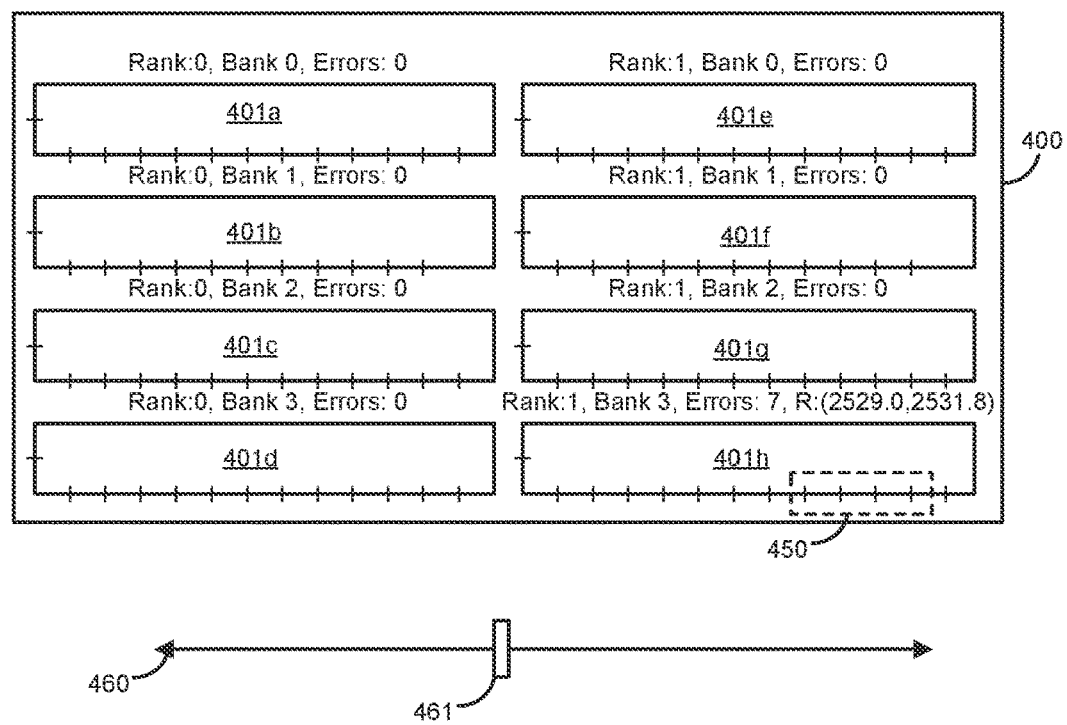
FIG. 4A illustrates memory error plots for a server DIMM according to an embodiment.

FIG. 4A illustrates memory error plots for a server DIMM according to an embodiment. Display 400 comprises plots 401*a-h* corresponding to 2 ranks of 4 banks each, or a total of 8 DRAM ICs. In this example, indications of the error locations for each plot are displayed to a user. Here, plots 410*a-g* illustrate that the corresponding DRAMs have no errors. However, plot 401*h* illustrates that one or more errors exist in the DRAM at rank 1, bank 3, located in a range specified at 2529.0,2531.8. A slider 461 along a time line 460 is used in this example to view different errors at different times, for example. The position of the slider may be used to query stored error data and generate plots 401*a-h*. A user may select around the range as illustrated at 450 to zoom in on the cluster within the displayed range.

Figure 4B:
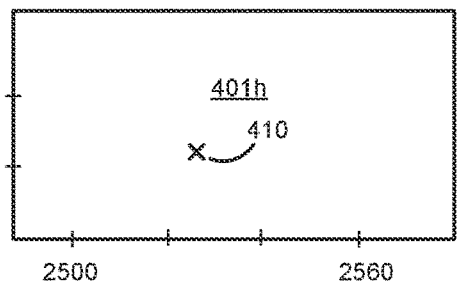
FIG. 4B illustrates a memory error plot at a first time point for a server DIMM according to another embodiment.
Figure 4C:
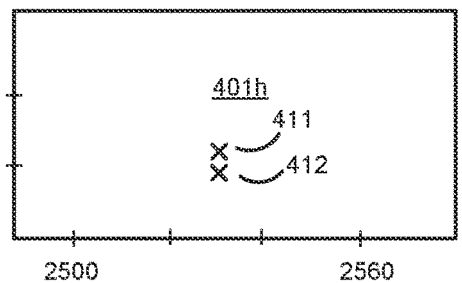
FIG. 4C illustrates a memory error plot at a second time point for a server DIMM according to another embodiment.
Figure 4D:
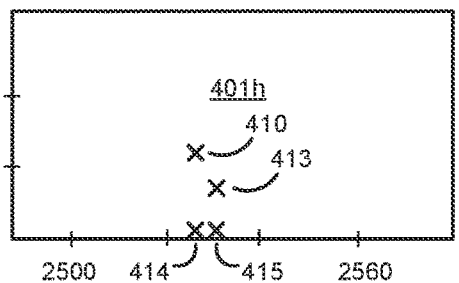
FIG. 4D illustrates a memory error plot at a third time point for a server DIMM according to another embodiment.
Figure 4E:
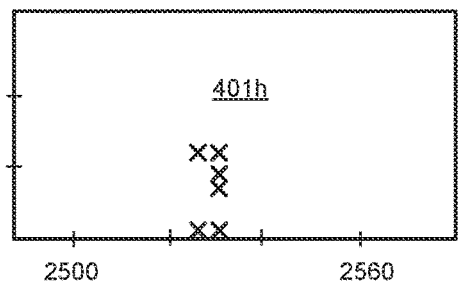
FIG. 4E illustrates an aggregated memory error plot for a server DIMM according to another embodiment.

FIG. 4B-E illustrate error data in plot 401*h* at different time points according to an embodiment. The plot in FIG. 4B may be generated at one slider position (or time point), t1, on the time line 460. When the slider is in position t1, a single error 410 may be illustrated (e.g., a correctable error, CE). In FIG. 4C, the slider is at a later time point, t2, and two new CEs 411 and 412 are observed, while error 410 is no longer observed. In FIG. 4D, error 410 is observed again, together with new CEs 413-415. FIGS. 4B-4D thus illustrate that CEs may not be permanent (they may be observed at times and not at other times). An aggregated pattern of observed errors is illustrated in FIG. 4E. In some embodiments, moving the slider may show the aggregated CEs observed at different locations up to that point (e.g., even if one or more CEs are not observed at a particular time point as in FIGS. 4B-D). Patterns of CEs may be displayed to a user in a plot and the user may define rules. The rules may specify particular patterns that result in uncorrectable errors (UEs), which require maintenance to repair, for example. Note that in an aggregated pattern, an x symbolizes an address has experienced at least one CE. Thus, once an "x" is in the plot it remains displayed. When the slider is shifted in time more indications of errors ("x") come into the plot. The grey scale of an indication of an error ("x") can be a measure for how often this address has experienced a CE compared to the other addresses at a particular time (position of the slider).

Figure 5:
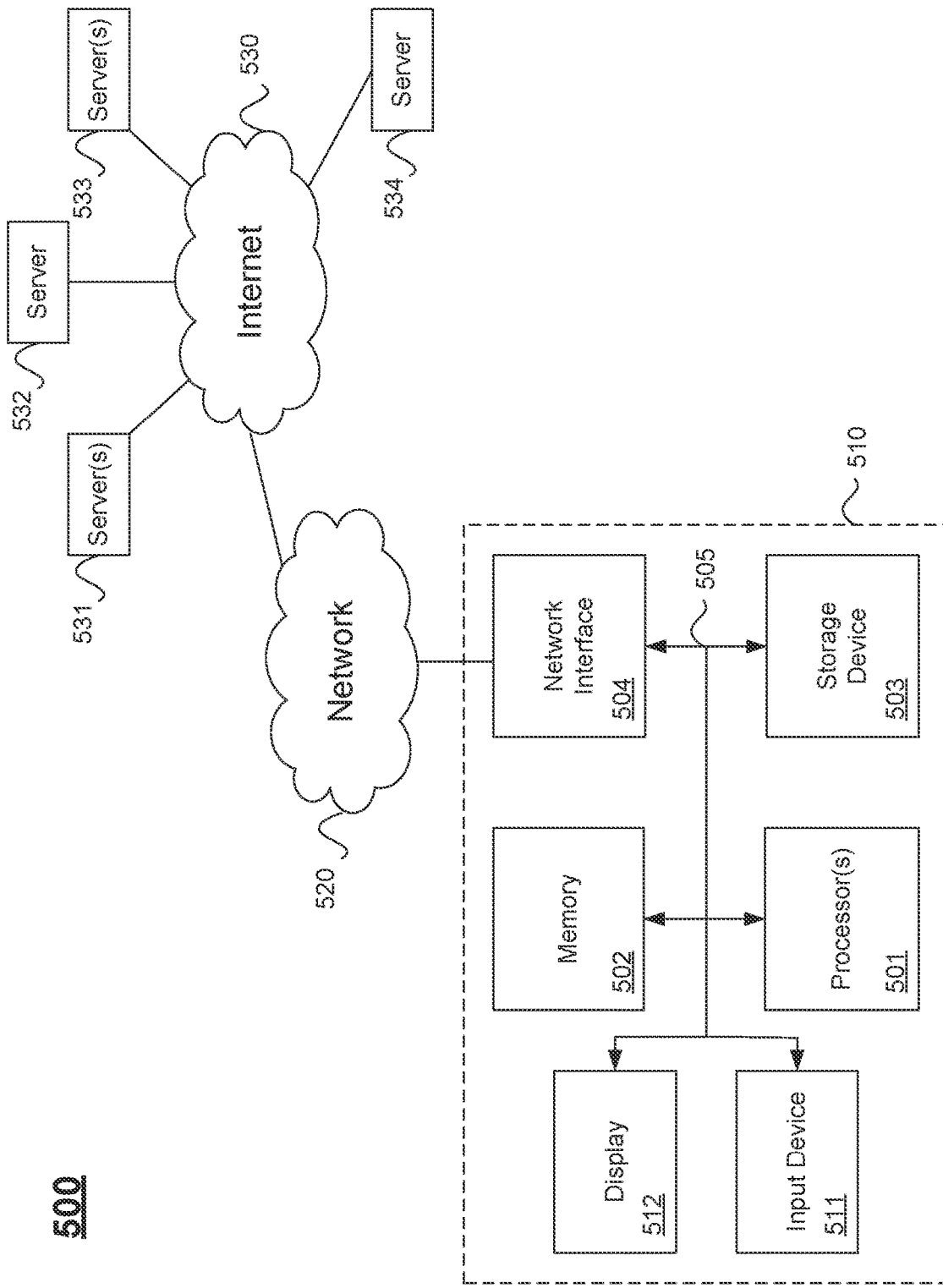
FIG. 5 is an example computer hardware system with an improved document validation system according to an embodiment.

FIG. 5 illustrates hardware of a special purpose computing machine configured according to the above disclosure. The following hardware description is merely one example. It is to be understood that a variety of computer topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

Computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a front end (e.g., a browser), for example, may access data and features on backend software systems that may reside on multiple different hardware servers on-prem 531 or across the Internet 530 on servers 532-535. One or more of servers 532-535 may also reside in a cloud computing environment, for example.

Further Examples

Each of the following non-limiting features in the following examples may stand on its own or may be combined in various permutations or combinations with one or more of the other features in the examples below. In various embodiments, the present disclosure may be implemented as a processor or method.

Embodiments of the present disclosure include techniques for predictive memory maintenance visualization.

In one embodiment, the present disclosure includes a method of managing memory errors comprising: detecting a plurality of errors in a random access memory; for each error of the plurality of errors, determining a row and a column in the random access memory, the row and column specifying error locations; and generating a plot in a display, wherein the plot displays indications of the error locations, and wherein the indications of the error locations are displayed based on a first axis corresponding to one of the rows or columns and a second axis corresponding to the other one of the rows or columns.

In one embodiment, the random access memory is a dynamic random access memory located on a dual in-line memory module comprising a plurality of dynamic random-access memory integrated circuits.

In one embodiment, the dual in-line memory module comprises a plurality of ranks and a plurality of banks, wherein generating a plot further comprises generating a plurality of plots for the plurality of banks across the plurality of ranks, wherein each plot having one or more indications of the error locations further displays one or more ranges specifying one or more corresponding clusters of indications of the error locations.

In one embodiment, the method further comprises mapping a plurality of banks of the dual in-line memory module to a plurality of plots; separately querying error locations for each of the plurality of banks from a storage system; and plotting error locations for each of the plurality of banks in separate plots in the display.

In one embodiment, the method further comprises storing each error location in a storage system associated with a time stamp.

In one embodiment, generating a plot further comprises generating a time bar, wherein different positions of the time bar display different indications of the error locations based on the time stamps.

In one embodiment, generating a plot further comprises displaying one or more first ranges specifying one or more corresponding clusters of indications of the error locations.

In one embodiment, the method further comprises receiving a graphical selection of the plot including a second range, wherein the second range is greater than one of the first ranges of column and row values by an offset to encompass the error locations; and regenerating the plot, wherein the regenerated plot displays a subset of the first axis and a subset of the second axis based on the graphical selection to zoom in on said at least one of the ranges.

In one embodiment, the method further comprises receiving a rule specifying one or more patterns of error locations; detecting a plurality of errors having error locations satisfying the rule; and generating an alert in response to the error locations satisfying the rule.

In some embodiments, the present disclosure includes a system for managing memory errors comprising: at least one processor and at least one non-transitory computer readable medium storing computer executable instructions that, when executed by the at least one processor, cause the system to perform actions of the above described method. In another embodiment, the present disclosure includes a non-transitory computer-readable medium storing computer-executable instructions that, when executed by at least one processor, perform the above described method of managing memory errors.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method of managing memory errors comprising:
   detecting a plurality of errors in a random access memory;
   for each error of the plurality of errors, determining a row and a column in the random access memory, the row and column specifying error locations; and
   generating a plot in a display,
   wherein the plot displays indications of the error locations, and
   wherein the indications of the error locations are displayed based on a first axis corresponding to one of the rows or columns and a second axis corresponding to the other one of the rows or columns,
   wherein generating a plot further comprises displaying one or more first ranges specifying one or more corresponding clusters of indications of the error locations;
   the method further comprising:
   receiving a graphical selection of the plot including a second range, wherein the second range is greater than one of the first ranges of column and row values by an offset to encompass the error locations; and
   regenerating the plot,
   wherein the regenerated plot displays a subset of the first axis and a subset of the second axis based on the graphical selection to zoom in on said at least one of the ranges.

2. The method of claim 1, wherein the random access memory is a dynamic random access memory located on a dual in-line memory module comprising a plurality of dynamic random-access memory integrated circuits.

3. The method of claim 2, wherein the dual in-line memory module comprises a plurality of ranks and a plurality of banks, wherein generating a plot further comprises generating a plurality of plots for the plurality of banks across the plurality of ranks.

4. The method of claim 2, further comprising:
   mapping a plurality of banks of the dual in-line memory module to a plurality of plots;
   separately querying error locations for each of the plurality of banks from a storage system; and
   plotting error locations for each of the plurality of banks in separate plots in the display.

5. The method of claim 1, further comprising storing each error location in a storage system associated with a time stamp.

6. The method of claim 5, wherein generating a plot further comprises generating a time bar, wherein different positions of the time bar display different indications of the error locations based on the time stamps.

7. The method of claim 1, further comprising:
   receiving a rule specifying one or more patterns of error locations;
   detecting a plurality of errors having error locations satisfying the rule; and
   generating an alert in response to the error locations satisfying the rule.

8. A system for managing memory errors comprising:
   at least one processor;
   at least one non-transitory computer readable medium storing computer executable instructions that, when executed by the at least one processor, cause the system to perform actions comprising:
   detecting a plurality of errors in a random access memory;
   for each error of the plurality of errors, determining a row and a column in the random access memory, the row and column specifying error locations; and
   generating a plot in a display,
   wherein the plot displays indications of the error locations, and
   wherein the indications of the error locations are displayed based on a first axis corresponding to one of the rows or columns and a second axis corresponding to the other one of the rows or columns,
   wherein generating a plot further comprises displaying one or more first ranges specifying one or more corresponding clusters of indications of the error locations;
   the method further comprising:
   receiving a graphical selection of the plot including a second range, wherein the second range is greater than one of the first ranges of column and row values by an offset to encompass the error locations; and
   regenerating the plot,
   wherein the regenerated plot displays a subset of the first axis and a subset of the second axis based on the graphical selection to zoom in on said at least one of the ranges.

9. The system of claim 8, wherein the random access memory is a dynamic random access memory located on a dual in-line memory module comprising a plurality of dynamic random-access memory integrated circuits.

10. The system of claim 9, wherein the dual in-line memory module comprises a plurality of ranks and a plurality of banks, wherein generating a plot further comprises generating a plurality of plots for the plurality of banks across the plurality of ranks.

11. The system of claim 9, further comprising:
    mapping a plurality of banks of the dual in-line memory module to a plurality of plots;
    separately querying error locations for each the plurality of banks from a storage system; and
    plotting error locations for each of the plurality of banks in separate plots in the display.

12. The system of claim 8, further comprising storing each error location in a storage system associated with a time stamp, wherein generating a plot further comprises generating a time bar, wherein different positions of the time bar display different indications of the error locations based on the time stamps.

13. A non-transitory computer-readable medium storing computer-executable instructions that, when executed by at least one processor, perform a method of managing memory errors, the method comprising:
   detecting a plurality of errors in a random access memory;
   for each error of the plurality of errors, determining a row and a column in the random access memory, the row and column specifying error locations; and
   generating a plot in a display,
   wherein the plot displays indications of the error locations, and
   wherein the indications of the error locations are displayed based on a first axis corresponding to one of the rows or columns and a second axis corresponding to the other one of the rows or columns,
   wherein generating a plot further comprises displaying one or more first ranges specifying one or more corresponding clusters of indications of the error locations;
   the method further comprising:
   receiving a graphical selection of the plot including a second range, wherein the second range is greater than one of the first ranges of column and row values by an offset to encompass the error locations; and
   regenerating the plot,
   wherein the regenerated plot displays a subset of the first axis and a subset of the second axis based on the graphical selection to zoom in on said at least one of the ranges.

14. The non-transitory computer-readable medium of claim 13, wherein the random access memory is a dynamic random access memory located on a dual in-line memory module comprising a plurality of dynamic random-access memory integrated circuits.

15. The non-transitory computer-readable medium of claim 14, wherein the dual in-line memory module comprises a plurality of ranks and a plurality of banks, wherein generating a plot further comprises generating a plurality of plots for the plurality of banks across the plurality of ranks.

16. The non-transitory computer-readable medium of claim 14, further comprising:
   mapping a plurality of banks of the dual in-line memory module to a plurality of plots;
   separately querying error locations for each the plurality of banks from a storage system; and
   plotting error locations for each of the plurality of banks in separate plots in the display.

17. The non-transitory computer-readable medium of claim 13, further comprising storing each error location in a storage system associated with a time stamp, wherein generating a plot further comprises generating a time bar, wherein different positions of the time bar display different indications of the error locations based on the time stamps.

* * * * *